United States Patent
Rupp et al.

(10) Patent No.: US 6,463,381 B1
(45) Date of Patent: Oct. 8, 2002

(54) DEVICE FOR TRANSFERRING MEASURED VALUES AND MEASUREMENT TIMES TO A PROCESSING DEVICE

(75) Inventors: Ingolf Rupp, Ludwigsburg; Michael Lehner, Muehlacker, both of (DE)

(73) Assignee: Robert Bosch GmbH, Stuttgart (DE)

( * ) Notice: Subject to any disclaimer, the term of this patent is extended or adjusted under 35 U.S.C. 154(b) by 26 days.

(21) Appl. No.: 09/703,816

(22) Filed: Nov. 1, 2000

(30) Foreign Application Priority Data

Nov. 5, 1999 (DE) .......................................... 199 53 192

(51) Int. Cl.⁷ .............................................. G06F 19/00
(52) U.S. Cl. ........................................................ 701/115
(58) Field of Search ................................ 701/115, 114, 701/102, 110, 105, 29, 35, 101; 123/406.64, 406.65, 406.58, 406.59; 73/116, 117.3

(56) References Cited

U.S. PATENT DOCUMENTS

| | | | | |
|---|---|---|---|---|
| 4,889,095 A | * | 12/1989 | Sogawa ................ | 123/406.47 |
| 4,924,830 A | | 5/1990 | Abe ............................ | 73/116 |
| 4,945,473 A | * | 7/1990 | Holtey et al. ................ | 703/25 |
| 4,951,628 A | * | 8/1990 | Matsuoka et al. ..... | 123/406.65 |
| 4,967,709 A | * | 11/1990 | Ozawa .................. | 123/406.65 |
| 5,033,432 A | * | 7/1991 | Ohuchi et al. ......... | 123/339.17 |
| 5,050,543 A | | 9/1991 | Kawamura ............... | 123/90.11 |
| 5,113,821 A | * | 5/1992 | Fukui et al. ................ | 123/333 |
| 5,586,305 A | | 12/1996 | Eidson ........................ | 703/11 |
| 5,659,302 A | | 8/1997 | Cordier ................. | 340/870.11 |
| 5,712,784 A | * | 1/1998 | Fendt et al. .................... | 701/29 |
| 6,167,337 A | * | 12/2000 | Haack et al. ................. | 701/32 |

FOREIGN PATENT DOCUMENTS

| | | |
|---|---|---|
| EP | 0 903 655 A | 3/1999 |
| FR | 2 685 958 A | 7/1993 |
| WO | 96 01979 A | 1/1996 |
| WO | 98/39131 A | 9/1998 |

* cited by examiner

*Primary Examiner*—John Kwon
*Assistant Examiner*—Hieu T. Vo
(74) *Attorney, Agent, or Firm*—Michael J. Striker

(57) ABSTRACT

A device for transferring measured values obtained by a sensing device to a processing device for processing these measured values is described. The described transfer device is provided with an interface between the sensing device and the processing device. The interface device has a memory in which the measured valued obtained by the sensing device are stored together with the respective time points at which the measured values were obtained. Actual values of the variable measured by the sensing device together with their measurement times are thus available to the processing device under all circumstances with a minimum effort. Other actual values can be obtained at times before, between or after the respective time points at which the measured values were obtained by interpolation, extrapolation or other estimation methods from the measured values and associated time points stored in the interface.

7 Claims, 1 Drawing Sheet

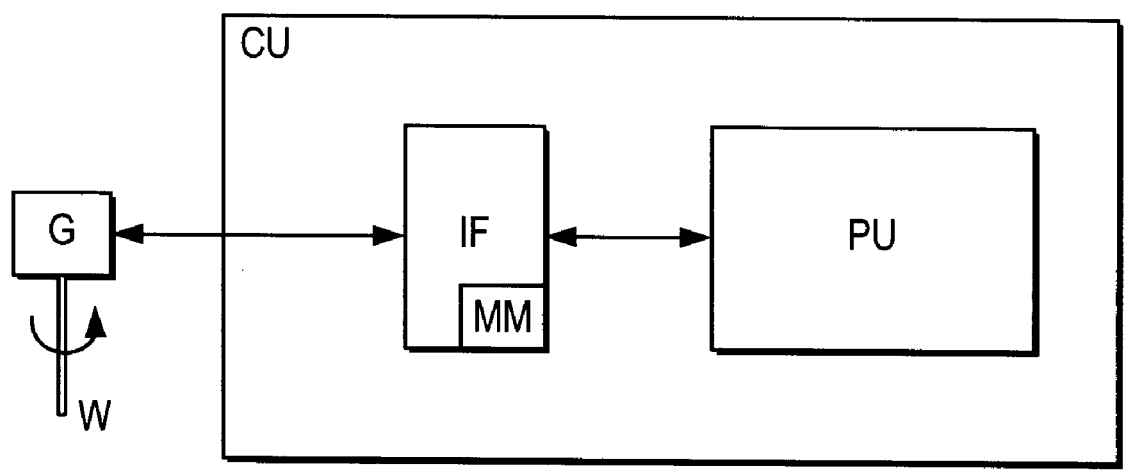

DEVICE FOR TRANSFERRING MEASURED VALUES AND MEASUREMENT TIMES TO A PROCESSING DEVICE

BACKGROUND OF THE INVENTION

1. Field of the Invention

The present invention relates to a data transferring device and, more particularly, to a transferring device for transferring measured values obtained by a sensor device into a processing device for processing the measured values.

2. Prior Art

The above-mentioned sensor device is, for example, an absolute angular position sensor, by which an absolute angular position of a shaft is ascertained. The shaft can be, for example, a crankshaft or camshaft of an internal combustion engine. The measured values obtained from this type of sensor are angle values for the angular positions at which the observed shaft is oriented at respective measurement times.

When the sensor device is an absolute angular position signal generator for measurement of the angular position of the crankshaft or camshaft of an internal combustion engine, the above-named processing device is, for example, a microprocessor or a microcontroller of the control unit of the motor vehicle containing the concerned internal combustion engine. The motor vehicle control unit needs the above-named measured values of angular position for, among other things, timing the various fuel injection events.

Although there are many possible methods for reception of the measured values from an absolute angular position sensor or other sensor device into the processing device requesting these measured values and also for the manner and type of the transferring method from the sensor device to the processing device, these methods have various problems. These problems are described in the following paragraphs.

The reception of the measured values obtained by the sensor device in the processing device can occur A1) in response to a special command from the processing device (e.g. in response to a command from a program running in the processing device), or A2) automatically at predetermined time intervals (for example, every 10 ms).

In the first-named possibility (A1) the command normally occurs always exactly when the processing device (for example a program running in it) immediately demands the relevant information. This reception method has the advantage that the obtained information is always relatively current. Disadvantageously however the retrieval or reception of the information may be connected with a comparatively great effort. This can lead, for example, to very great demands or load on the processing device (for example if the information is required prior to each ignition event).

The second-named possibility (A2) for receiving the information in the processing device puts a comparatively reduced load on the processing device. However disadvantageously the obtained information is not always current when it is used. If the data, for example, are only read every 10 ms, the measured values may already be 10 ms delayed at the time when they are used. This can cause considerable inaccuracy when the rotating shaft whose position is being measured is rapidly rotating (e.g. a camshaft or crankshaft of an internal combustion engine driven at high speed).

Several possibilities exist for the manner and type of the transfer method for transferring the measured data picked up by the sensor device into the processing device, namely B1) transmission of an analog signal dependent on the measured values to the processing device (voltage level corresponding to a predetermined angular position), B2) transmission of a pulse-width modulated signal dependent on the measured values to the processing device (the angular position depends on the ratio of the high-level and low-level phases of the signal, and B3) transmission of a digital signal dependent on the measured values to the processing device (the measured values are generally serially transferred).

The first-named possibility (B1) has the advantage that a comparatively constant time delay is present and that the transfer of the measured values into the processing device can occur according to possibility A1 and also according to possibility A2. However the required D/A and/or A/D converters have a disadvantageously large cost. Also the transfer of the measured values into the processing device is unfortunately very susceptible to interference (especially interference caused by the electromagnetic field due to the ignition events and/or the incorrect scanning of the signals).

The second possibility (B2) is very robust regarding interference and permits a comparatively simple conversion and evaluation. Generally the data transfer only takes place according to the possibility A2, so that the data are always current at the end of a period of the pulse-width modulated signal.

The third possibility (B3) is similarly very robust regarding interference. Generally here also the transfer only takes place according to possibility A2, since the information can only be input at discrete times.

It should be apparent from the above explanation that it is not currently possible to transfer measured values of this type of data into a processing device, especially data regarding the angular position of a rapidly rotating shaft of an internal combustion engine, under all circumstances and to have current or real time data always available. This is true in spite of the many possibilities for transferring measured variables obtained by a sensor device into a processing device that are currently known in the art.

SUMMARY OF THE INVENTION

It is an object of the present invention to provide an improved transfer device of the above-described kind, which suffers at least to a lesser extent from the above-described disadvantages and which transfers actual measured values into the processing device under all circumstances.

According to the invention the transfer device for transferring measured values picked up by a sensor device into a processing device that processes the measured values comprises an interface between the sensor device and the processing device, in which the measured values obtained by the sensor device at predetermined times are stored with the respective times at which these values were obtained.

By providing an interface with memory means between the sensor device and the processing device the measured values detected by the sensor device can be fed into the processing device or read by another device or coded at another later time. Since the interface not only passes the measured values to the processing device, but also the respective times at which the values were measured, the values of the measured variable between the actual measurement times or at later times may be calculated or estimated.

This has proven to be advantageous in many respects. The interface can be constructed in many ways, e.g.

so that the processing device can obtain actual or current data with a minimal effort in the desired manner and way, so that the sensor device may be replaced with another sensor device without effecting the processor.

Advantageous embodiments are described in the following dependent claims, description and figures.

BRIEF DESCRIPTION OF THE DRAWING

The objects, features and advantages of the invention will now be illustrated in more detail with the aid of the following description of the preferred embodiments, with reference to the accompanying sole figure showing a simplified block diagram of a scanning device according to the invention for transferring measured values obtained by a sensor device into a processor.

DESCRIPTION OF THE PREFERRED EMBODIMENTS

The transfer device for transferring measured values obtained by a sensor device into a processing device according to the invention in the illustrated example is designed for use with an internal combustion engine in a motor vehicle. The sensor device is an absolute angular position signal generator, which detects the position of the camshaft. The processing device is a microcontroller contained in the control unit of the motor vehicle (or an otherwise progammable unit, such as a microprocessor).

At this point it should be pointed out that the broad conception of the transfer device according to the invention is not limited to the present embodiment. The transfer device can also be used in any arbitrary system for other purposes and with any arbitrary sensor device and/or other processing devices.

However it has already proven to be especially advantageous to use particular embodiments of the transfer device according to the invention with sensor devices which pick up certain measured values of particular variables, such as e.g. the angular position of a shaft, the speed, a temperature, etc. Nevertheless other embodiments of the transfer device may be used with other types of sensors (for example sensors, which only react under certain conditions or results).

The present transfer device is characterized by an interface provided between the sensor device and the processing device, in which variables detected by the sensor device together with the time points at which the variables were measured are stored in a memory MM in the interface IF.

The instant embodiment of the scanning device according to the invention is shown in the figures. The absolute angular position transmitter or signal generator is designated by the reference character "G", the shaft, whose angular position is being measured with the absolute angular position sensor G is designated with a "W" and the microcontroller with "PU", the control unit or controller with "CU" and the interface between the absolute angular position signal generator G and the microcontroller PU with the reference character "IF".

It has already been pointed out that the interface IF need not be arranged as shown in the present embodiment. It can also be provided outside of the controller or control unit CU. It can however be part of the microcontroller PU or another processing unit or it can form a single unit together with the processing device, for example on a single chip.

Because the absolute angular position signal generator G and the microcontroller PU are not directly connected with each other, but only indirectly by means of the interface IF, the transfer of data between the absolute angular position transmitter G and the interface IF can take place by an entirely different method and manner than the transfer of data between the interface IF and the microcontroller PU. The respective data transfers between the absolute angular position signal generator G and the interface IF and between the interface IF and the microcontroller PU are completely independent of each other. Thus it is possible to transfer data between the absolute angular position signal generator G and the interface IF by pulse-width modulated signals and also according to the above-described possibility B2 and to transfer data between the interface IF and the microcontroller PU by analog signals, also according to possibility B1.

Furthermore the time points at which the absolute angular position sensor device G outputs the measured values for the absolute angular position obtained by it can be independent of the time points at which the microcontroller PU receives those measured values from the interface IF. The start of the output of the measured values from the absolute angular position sensor device G can also be independent from the start of the input of those values from the interface IF to the microcontroller PU. Thus for example it is possible that the measured values from the sensor device are output to the interface IF in a predetermined time interval, also according to the above-described possibility. In contrast the further transfer of the concerned data from the interface IF to the microcontroller PU is coordinated so that the transfer of the data into the microcontroller PU occurs in a different time interval in response to a special command from a program running in the microcontroller, also according to the above-described possibility A1.

By insertion of the interface IF between the absolute angular position signal generator or sensor device G and the microcontroller PU also the reception possibilities (A1, A2) and the transmission possibilities (B1,B2,B3) can be combined with each other, which could not be combined with each other without the interface. For example, data which are output from the sensor device G with a pulse-width modulated signal, also according to transmission possibility B2, can be received in the microcontroller PU in response to a special command from a program running in the microcontroller PU, also according to reception possibility A1.

The transfer of the measured values obtained by the absolute angular position sensing device G can be optimally adjusted or fit to the specifications of the microcontroller PU. The transmission and reception of the data can occur so that reliability is maximized but the load or burden on the microcontroller is minimized.

As mentioned above the measured values (angles) obtained by the sensing device G are stored together with the times at which the respective measured values were obtained in the memory MM of the interface IF. This provides the possibility that the measured values supplied to the microcontroller represent the respective actual values of the variable to be determined at the measurement times under all circumstances (especially then, when the absolute angular position sensing device "only" outputs data in a predetermined time interval). The storage of the measured values determined by the absolute angular position sensing device together with the times at which they were obtained makes it possible to obtain other actual values of the parameter or variable to be determined by extrapolation or estimation methods.

The storage of the measured values determined by the absolute angular position sensing device G together with the associated times at which they were obtained is performed completely automatically by the interface, also without the participation or cooperation of the microcontroller PU. The microcontroller is thus not burdened by the need to provide and operate the interface IF. The storage of the data to be stored in the interface occurs by hardware features in the embodiment considered here.

Understandably the storage of the data can also occur by means of a microcontroller or another programmable unit or under cooperate or participation of the programmable unit. The microcontroller can participate in the storage of the data to be stored using a so-called peripheral transaction server (PTS) of the microcontroller.

There are no limitations regarding which time intervals in which the measured values have been obtained from the sensing device or in response to which events the measured values are obtained. In the simplest case the storage occurs during predetermined constant time intervals. For the case in which the measured values determined by the absolute angular position sensing device are periodically transferred by a pulse-width modulated signal to the interface, the time interval can be, for example, the period of the pulse-width modulated signal. The size of the time interval can however be arbitrarily set in principal. However the measured values obtained by the absolute angular position sensing device may be stored in the interface when they reach predetermined values or when certain arbitrary other conditions or results have occurred.

For the case in which the measured values obtained by the absolute angular position sensing device and the associated time intervals are stored in a predetermined time interval T, the measured value/time point pairs have for example the following values:

| Measured values | 34° | 38.5° | 42.5° | 47° | 51° |
|---|---|---|---|---|---|
| Time points | $t_0$ | $t_0+T$ | $t_0+2T$ | $t_0+3T$ | $t_0+4T$ |

Because not just a measured value/time point pair, but a plurality of measured value/time point pairs are stored, for example the values of the variable at times that are later than the time at which the last measured value was stored can be calculated by extrapolation or estimation methods. Thus in the example under consideration it is possible to determine the angular position α at the time point $t_0+4.5T$ according to the following symbolic relationship.

$$\alpha(t_0+4.5T)=f(t_0+4.5T; 34°, t_0; 38.5°, t_0+T; 42.5°, t_0+2T; 47°, t_0+3T; 51°, t_0+4T)$$

For example, if it can be established that $$\alpha(t_0+4.5T)=51°+(51°-34°)/(t_0+4T-t_0)*(t_0+4.5T-(t_0+4T)), \text{then}$$

$$\alpha(t_0+4.5T)=53.125°.$$

The angular position α can also be computed according to other algorithms according to the rotation behavior of the shaft W and/or other preferences.

The measured angular position α corresponds exactly to the actual angular position of the shaft being monitored in the ideal case. Because of that the actual angular position values can be prepared at any time under all circumstances in the microcontroller PU.

Measured value/time point pairs that are no longer needed for extrapolations, interpolations or the like estimations may be erased.

The provision of the interface IF facilitates replacement of the absolute angular position sensing device with another such device. When the new absolute angular position sensing device outputs the data obtained at another starting point and/or the data are transferred in another manner, the microcontroller PU can operate in an unchanged manner. Only the interface IF needs to be adjusted to the changed behavior or specifications of the new sensing device, which however is comparatively easy to do.

The respective exact actual values of the variable measured by the sensor can be made available to the processing device by the transfer device described hereinabove with a minimum of effort under all circumstances.

The disclosure in German Patent Application 199 53 192.7 of Nov. 5, 1999 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a device for transferring measured values obtained by a sensor device into a processing device, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A device for transferring measured values of a variable obtained by a sensor device Into a processing device (PU), said device comprising an interface (IF) provided between said sensor device (G) and said processing device (PU) said interface (IF) including means for storing said measured values and respective times at which said measured values were obtained by said sensor device (G), wherein the means for storing said measured values in said interface (IF) stores associated pairs of said measured values and said respective times, said interface (IF) Including means for computing or estimating actual values of said variable at times before, between, or after said respective times at which said measured values were obtained from said sensor device (G) based on said associated pairs of said measured values and said respective times.

2. The device as defined in claim 1, wherein said interface (IF) includes means for supplying data by said sensor device to said processing device In coded form or as obtained from said sensor device.

3. The device as defined in claim 1 or 2, wherein said interface (IF) includes means for supplying data obtained by said sensor device to said processing device (PU) at other time points, in other time intervals or at other starting times than time points, time intervals or initial times at which said data is obtained by said sensor device.

4. The device as defined in claim 1, wherein said sensor device (G) is an absolute angular position sensor device (G) for measuring angular position of a camshaft or crankshaft of an internal combustion engine.

5. The device as defined in claim 1, wherein the processing device (PU) is a programmable unit of a motor vehicle control unit (CU).

6. The device as defined in claim 5, wherein said interface (IF) is provided in said motor vehicle control unit (CU).

7. The device as defined in claim 1, wherein said interface (IF) and said processing device (PU) are combined in a single unit.

* * * * *